United States Patent [19]

Itoh

[11] Patent Number: 5,785,377
[45] Date of Patent: Jul. 28, 1998

[54] ARTICLE FIXTURE AND METHOD OF FITTING ARTICLE BY USING THE FIXTURE

[75] Inventor: Akira Itoh, Sagamihara, Japan

[73] Assignee: Minnesota Mining and Manufacturing Company, St. Paul, Minn.

[21] Appl. No.: 663,950

[22] Filed: Jun. 14, 1996

[30] Foreign Application Priority Data

Jun. 19, 1995 [JP] Japan ............................ 7-151857

[51] Int. Cl.$^6$ .......................................... B60J 1/10
[52] U.S. Cl. .......................... 296/146.15; 49/462
[58] Field of Search ................ 296/96.21, 146.15; 49/462; 403/315, 316, 405.1, 406.1; 24/664, 687, 688, 704.1

[56] References Cited

U.S. PATENT DOCUMENTS 5,522,636  6/1996  Kolar, Jr. ..................... 296/146.15
5,558,387  9/1996  Sumida et al. ............... 296/96.21

FOREIGN PATENT DOCUMENTS 3332234  3/1985  Germany ................... 296/146.15
5-92718  4/1993  Japan ............................. B60J 1/02
6156076  6/1994  Japan .......................... 296/146.15

*Primary Examiner*—Jesus D. Sotelo
*Attorney, Agent, or Firm*—Charles D. Levine

[57] ABSTRACT

An article fixture 10 includes a projecting portion 14 which comprises a lower part 16 connected with a base portion 12 and an upper part 18 displaceable along the lower part 16. The upper part 18 is connected at a first height with the lower part 16 through interconnecting portions which can be broken by a predetermined force. When the interconnecting portions are broken, the upper part 18 is displaced into the second height lower than the first height. The upper part 18 has a pawl 24 which is integrally formed and laterally extended adjacent to the top face 18a. The pawl 24 is hooked with the objective body, thereby mechanically locking the projecting portion 14 at a predetermined position on the objective body. The base portion 12 is provided with a resilient hook 26, and the upper part 18 of the projecting portion 14 is provided with a recess 28 into which the resilient hook 28 is engaged. The hook 26 is engaged with the recess 28, thereby the upper part 18 is mechanically held at the second height.

9 Claims, 14 Drawing Sheets

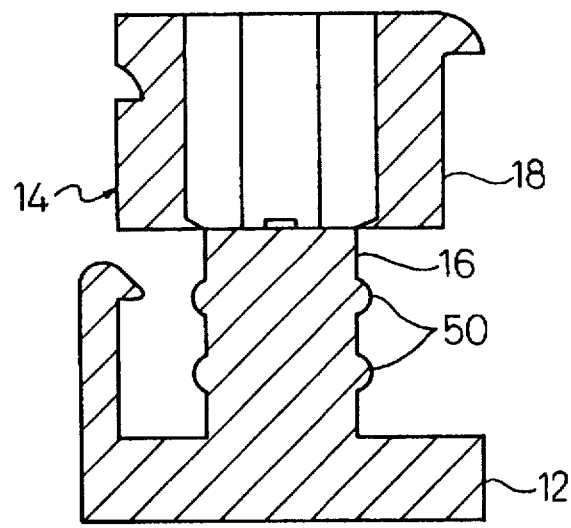
FIG. 7a
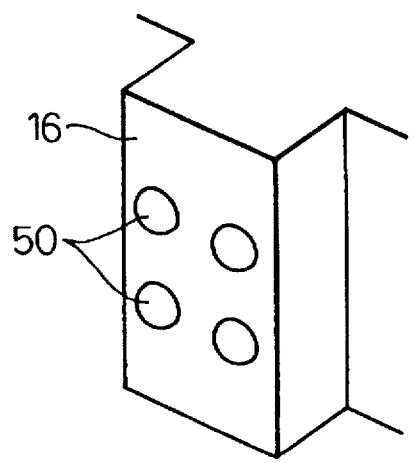 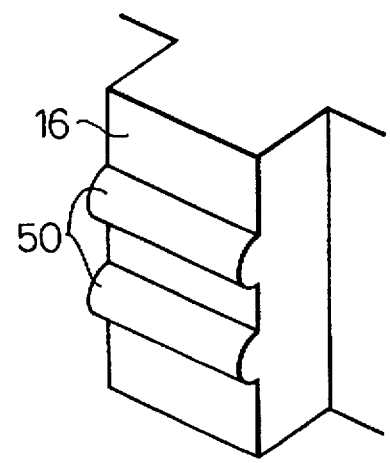
FIG. 7b  FIG. 7c

FIG. 9a
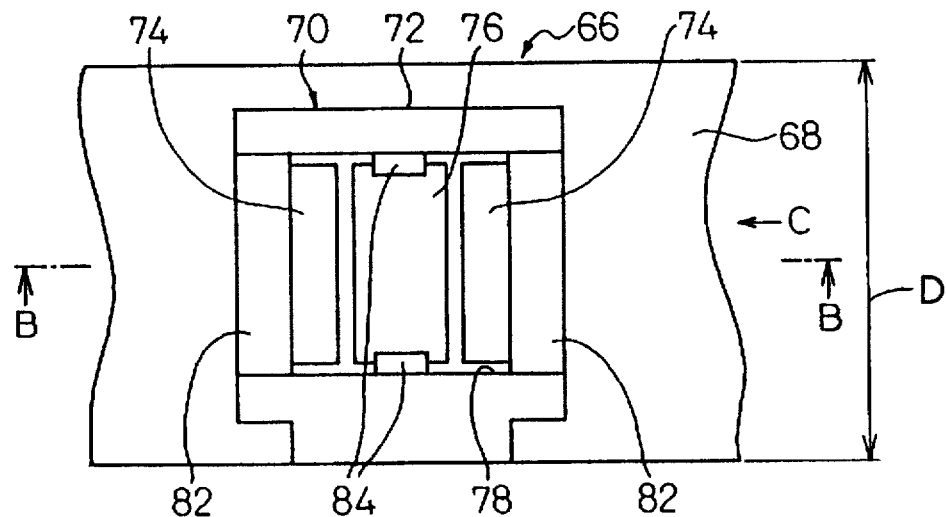
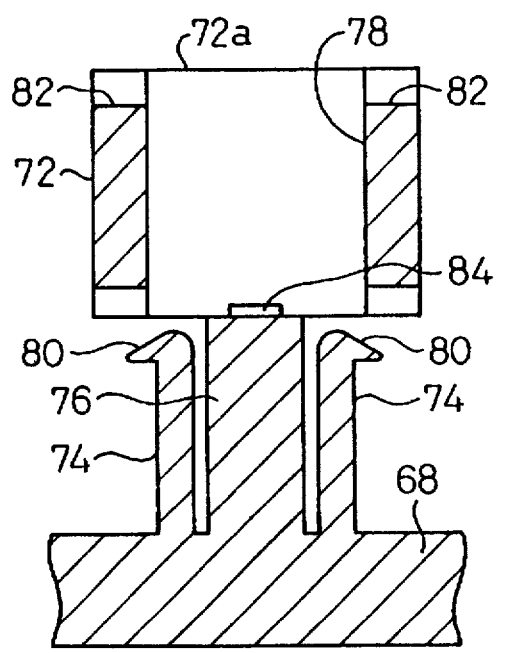
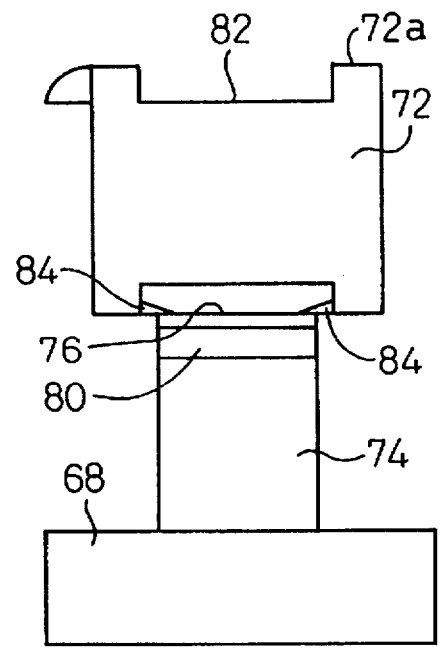
FIG. 9b
FIG. 9c

ARTICLE FIXTURE AND METHOD OF FITTING ARTICLE BY USING THE FIXTURE

FIELD OF THE INVENTION

The present invention relates to an article fixture, more particularly the invention relates to an article fixture for fixedly connecting an article with an objective body while keeping a predetermined space therebetween, and also relates to a method of fitting the article to the objective body by using such article fixture.

BACKGROUND OF THE INVENTION

In general, in case of firmly connecting a surface finished with high precision, with a surface finished with low precision like an uneven or rough surface, it is advantageous to bond both surfaces by fulfilling a gap generated therebetween with an adhesive layer of a predetermined thickness. Also, in case of firmly connecting a relatively fragile object with a relatively tough one, it is advantageous to bond both objects by inserting an adhesive layer of a predetermined thickness as a buffer layer for keeping a predetermined space therebetween in order to prevent the fragile object from being damaged by vibration mutually transmitted therebetween or the like.

For instance, in case of fixing a fixed type window glass (i.e., an article) to a window frame (i.e., an objective body) in the process of manufacturing vehicles and of constructing architectures, the surface of the window frame often includes unnecessarily uneven and rough portions, and vibration of the window frame would sometimes invite even a risk of causing breakdown of the window glass, so that a method of bonding the window glass with the window frame while keeping a predetermined space therebetween is generally adopted. Especially, in the process of manufacturing motor cars, an adhesive layer, which is formed of an adhesive agent having sealing and cushioning properties like a urethane adhesive, is applied to the entire edge portion of a fixed type window glass like a rear window glass of the motor car, and then the window glass is firmly bonded with the car window frame with pertinent positioning thereof. In this case, in order to prevent the window glass from being shifted from its right position by vibration of the car body and variation in the car room pressure which inevitably occur during the car manufacturing process and also to prevent the adhesive layer from being damaged, an article fixture, which can surely holds the window glass at a predetermined position while keeping a predetermined space between the window glass and the window frame until the adhesive layer is completely solidified, is used as an assistant.

As the above-mentioned article fixture, a spacer disclosed in a Japanese Unexamined Patent Publication (Kokai) No. 5-92718 is known. This spacer has a base portion which is fixedly bonded with both the window glass and the flange of the window frame, and a projecting portion which projects out of the base portion with a thin interconnecting portion arranged therebetween. When a pushing force directing to the base portion is applied to the projecting portion, the interconnecting portion is broken, thereby the projecting portion being pushed back to the base portion.

In case of using this spacer, first a double coated adhesive tape is applied to the window opposing and flange opposing surfaces of the base portion and the base portion is adhesively fixed on the window glass, then an adhesive layer is formed on the window glass surface adjacent to the spacer in such a manner that its thickness is lower than the height of the projecting portion but higher than the height of the base portion. When the window glass is positioned with the projecting portion being abutted on the flange of the window frame, the adhesive layer will not make any contact with the flange. Accordingly, not only the positioning of the window glass is made easier but also the window frame is prevented from being soiled with the adhesive inadvertently stuck on the flange portion. After positioning the window glass, when the window glass is pushed toward the flange with a predetermined force, the projecting portion of the spacer is moved back to the base portion, and the base portion is stuck on the flange of the window frame by the double coated adhesive tape. At this time, a predetermined space equal to the thickness of the base portion is formed between the window glass and the flange of the window frame, and the adhesive layer is made to contact with the flange of the window frame. When the adhesive layer is completely solidified in this state, the window glass and the flange of the window frame are firmly fixed to each other while keeping a predetermined space therebetween.

In the above-mentioned spacer, the base portion is fixed on both the window glass and the flange of the window frame by an adhesive means, such as the double coated adhesive tape. Accordingly, when the window glass, stuck on the flange of the window frame in the above-mentioned manner, is conveyed to the next manufacturing step before the adhesive means for fixing the spacer displays its full adhesion force on the flange of the window frame, the separation of the adhesive means may be caused by vibration of the car body and variation in the car room pressure, so that the window glass may be displaced from a predetermined position. In the process of manufacturing motor cars, especially, the car doors are frequently opened and closed even after fixing the fixed type window glasses to respective window frames. Accordingly, variation in the car room pressure as caused under such condition can easily peel off the adhesive means such as the double coated adhesive tape, thereby the window glass is risen up from the window frame. If the adhesive layer for fixing the window glass to the window frame is solidified under such a condition as the window glass is displaced, the appearance of the motor car would be spoiled, and the effective sealing between the window glass and the window frame would be lost, which result in the leakage of water.

Accordingly, it is an object of the present invention to provide an article fixture which, in case of adhesive bonding an object having a surface finished with high precision to an object having a surface finished with low precision, or adhesive bonding a relatively fragile object to a relatively tough one, such as the case of adhesive bonding an article like a window glass to an objective body like a window frame, can act as an auxiliary member capable of securely holding both objects until an adhesive layer provided therebetween is completely solidified with a predetermined thickness, and can firmly and fixedly connect the article and the objective body while keeping a predetermined space therebetween against the external force. The other object of the present invention is to provide a method of fitting an article by using such an article fixture.

SUMMARY OF THE INVENTION

In order to achieve the above object, the present invention provides an article fixture having a base portion adapted to be fixed to an article and a projecting portion projecting from the base portion up to a first height and being displaceable from the first height to a second height lower than the first height by a predetermined force; the article fixture being used for positioning the article at a predetermined position on an objective body by abutting the projecting portion on the objective body when the projecting portion is put at the first height, and for fixedly connecting the article to the objective body while keeping a predetermined space therebetween when the projecting portion is put at the second height, characterized in that the article fixture comprises a lock means for mechanically locking the projecting portion onto a predetermined position on the objective body; and a holding means for mechanically holding the projecting portion at the second height.

According to the preferred embodiment of the present invention, the lock means may comprise a projection which is integrally formed in an end region of the projecting portion so as to be locked onto the objective body. Also, the holding means may comprise a resilient hook which is integrally formed with the article fixture, and a recess which is formed in the article fixture and is engaged with the hook when the projecting portion is put in the second height.

According to another preferred embodiments of the present invention, the projecting portion may be connected at the first height with the base portion through an interconnecting portion breakable by a predetermined force, and the base portion may be provided with a hollow portion which receives the projecting portion displaced at the second height by breaking the interconnecting portion. Alternatively, the projecting portion may include a lower part projecting from the base portion and an upper part arranged displaceably along the lower part; the upper part being connected at the first height extended from the lower part with the lower part through an interconnecting portion breakable by a predetermined force, and the upper part being provided with a hollow portion which receives the lower part when the upper part is displaced in the second height by breaking the interconnecting portion. In this case, the projecting portion and the hollow portion may be dimensioned such that an outer surface of the projecting portion to be received in the hollow portion is always in contact with an inner surface of the hollow portion when the projecting portion is displaced from the first height to the second height.

The article fixture may be particularly conveniently used when the article is a fixed type window glass of a vehicle, and the objective body is a window frame of a vehicle body.

The present invention further provides a method of fitting an article to an objective body by using the article fixture as defined in any one of claims 1 through 7, characterized in that the method comprises the steps of fixing the article fixture to an article; forming an adhesive layer on an article surface adjacent to the article fixture up to a height between the first and second heights of the projecting portion; abutting the projecting portion in the first height onto the objective body, and mechanically locking the article fixture by the lock means onto a predetermined position on the objective body, thereby positioning the article to the predetermined position on the objective body; displacing the projecting portion into the second height by applying a predetermined force, and mechanically holding the projecting portion by the holding means at the second height, thereby fixedly connecting the article with the objective body while keeping a predetermined space therebetween; and solidifying the adhesive layer between the article and the objective body.

The fixture having its base portion fixed on the article is placed at a predetermined position of the objective body by abutting the projecting portion being at the first height onto the objective body and mechanically locking the projecting portion onto the objective body at the predetermined position. Next, the projecting portion is displaced by a predetermined force to the second height and is mechanically held at the second height by the holding means. In this way, the article and the objective body can be fixedly connected with each other against the external force while keeping a predetermined space therebetween.

In the case where the lock means is formed as a projection which is integrally formed in the end region of the projecting portion, when the end of the projecting portion is placed on the objective body, the projecting portion can be readily and mechanically locked onto the objective body at a predetermined position through the coupling of the projection and the objective body. Besides, in the case where the holding means is constituted with the resilient hook and the recess which are integrally formed with the fixture, the hook and the recess are readily coupled without causing any breakdown thereof when the projecting portion is displaced to the second height.

The interconnecting portion which connects the projecting portion staying at the first height with the base portion, keeps the projecting portion at the first height when the projecting portion is placed on the objective body, thus positioning of the article being made easier. When the interconnecting portion is broken with a predetermined force, the projecting portion is guided along the wall of the hollow portion and is smoothly displaced to the second height. The broken interconnecting portion cannot move the projecting portion back to the first height, so that the projecting portion can be easily and surely held at the second height by the holding means. When the article fixture is constructed in such a manner that the outer surface of the projecting portion to be contained in the hollow portion is made always in contact with the inner surface of the hollow portion, this guiding function is further improved, thereby the article being more accurately fitted to the predetermined position of the objective body.

The fixture in which the projecting portion includes lower and upper parts mutually connected by the interconnecting portion at the first height, can function in a manner similar to the above-mentioned manner. In this case, however, the hollow portion is formed in the upper part, so that no opening of the hollow portion is formed on the back surface of the base portion. Accordingly, it is possible to keep an adequate area in the back surface of the base portion for use in fixing the fixture to the article, thus the fixture being prevented from inadvertently falling from the article.

When such a fixture as described above is used for fitting the fixed type vehicle window glass to the window frame of the vehicle body, it is possible to position the window glass to the window frame at a predetermined position without having the window glass touched with the adhesive layer for fixing the window glass to the window frame, by abutting the projecting portion onto the objective body and mechanically locking the projecting portion in a predetermined position by the lock means. At this stage, when the projecting portion is displaced to the second height, it is mechanically held at the second height by the holding means and the adhesive layer comes into contact with the window glass. Mechanical locking function rendered by the lock means as well as mechanical holding function served by the holding means contributes to the fixed connection of the window glass on the window frame at a predetermined position thereof against the vibration of the vehicle body and the variation in vehicle room pressure, until the adhesive layer is fully solidified, in the manufacturing process of vehicles.

BRIEF DESCRIPTION OF THE DRAWINGS

FIGS. 7(a), (b) and (c) are illustrations of a modification of the article fixture of FIG. 1 with FIG. 7(a) being a sectional view, FIG. 7(b) being an enlarged view of projections provided on the lower part, and FIG. 7(c) being an enlarged view of modified projections provided on the lower part;

FIGS. 9(a), 9(b), and 9(c) are illustrations of an article fixture according to another embodiment of the present invention with FIG. 7(a) being a top view in part, FIG. 7(b) being a sectional view taken along a line B—B, and FIG. 7(c) being a side view observed from an arrow C;

DETAILED DESCRIPTION OF THE INVENTION

Figure 1:
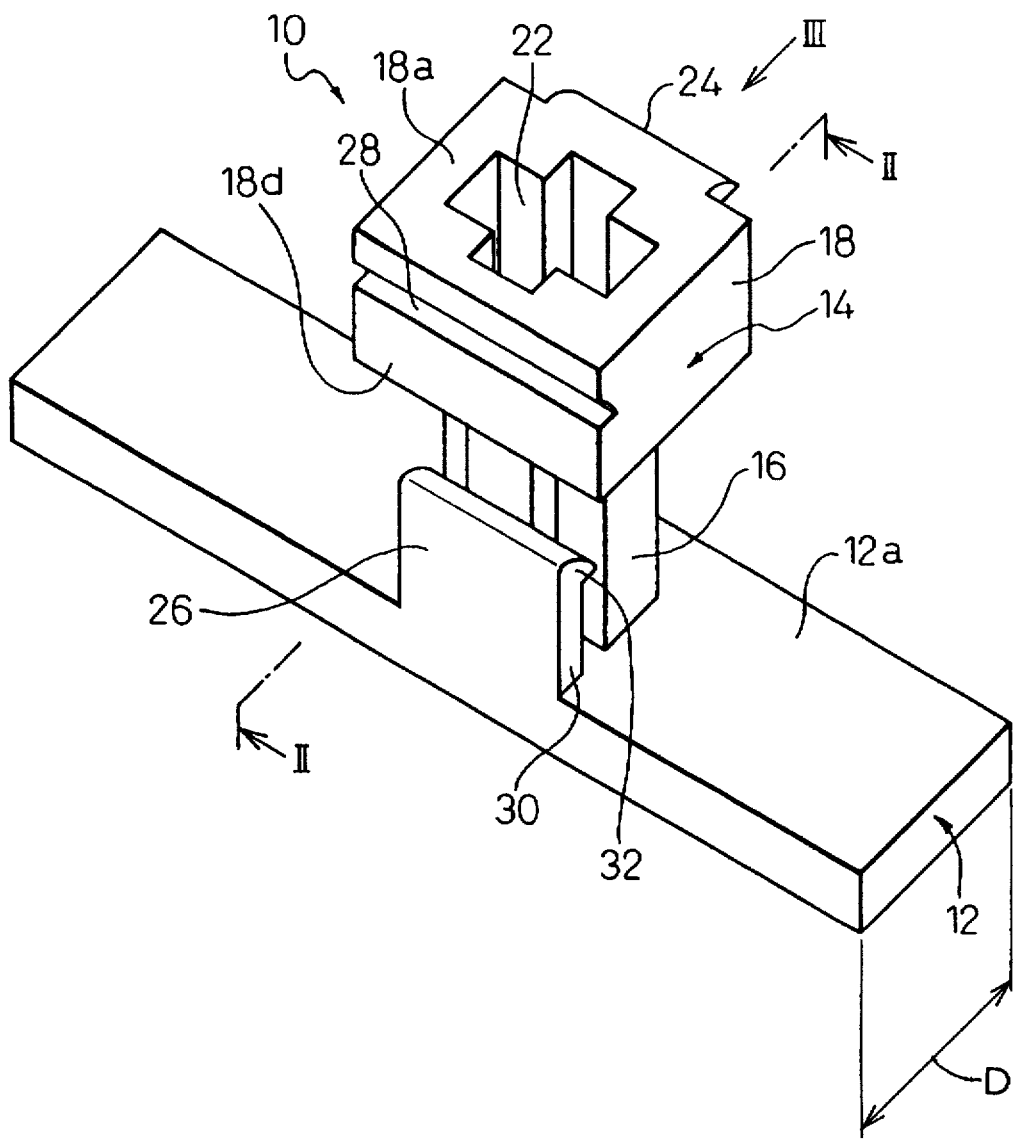
FIG. 1 is a perspective view of an article fixture according to the embodiment of the present invention.

The present invention will be described in detail below, referring to the embodiments shown in the accompanying drawings. In the drawings, same or similar components are indicated by common reference numerals.

Figure 2:
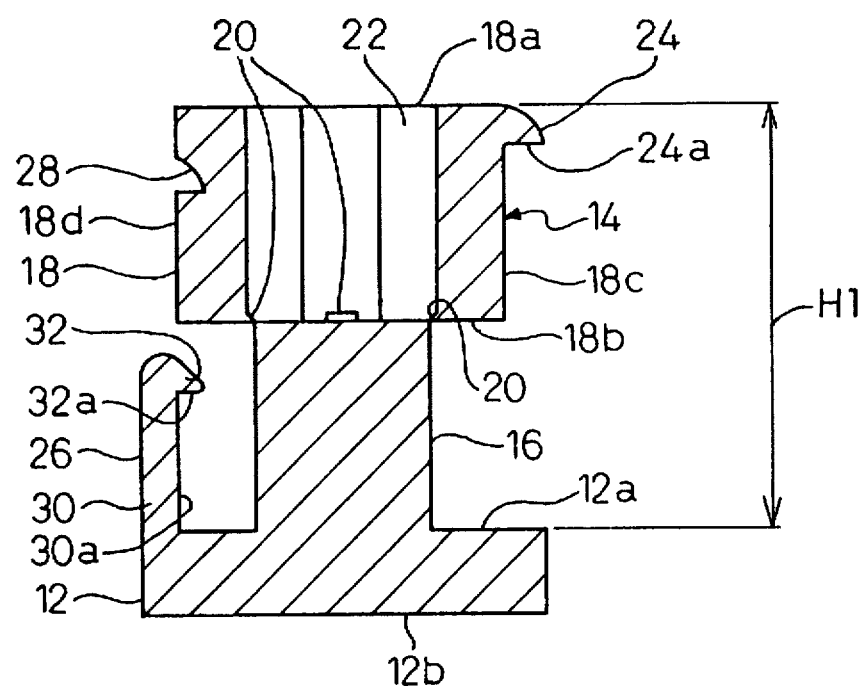
FIG. 2 is a cross-sectional view of the article fixture of FIG. 1 taken along a line II—II of the same.

FIGS. 1 and 2 show an article fixture 10 according to the embodiment of the present invention. Preferably, the article fixture 10 is integrally molded from a polymeric material, and includes a base portion 12 shaped as a generally flat plate and a projecting portion 14 projecting generally upright from the center of the main surface 12a of the base portion 12. The projecting portion 14 includes a lower part 16 integrally joined to the base portion 12 and an upper part 18 arranged movably along the lower part 16. The upper part 18 is connected at a first height H1 extended from the lower part 16, as shown in the figure, with the lower part 16 through an interconnecting portion 20 breakable by a predetermined force. When the interconnecting portion 20 is broken and the upper part 18 is sifted along the lower part 16 toward the base portion 12, the upper part 18 is displaced from the first height H1 to the second height H2 lower than the first height H1 (see FIG. 4(b)).

Figure 3A:
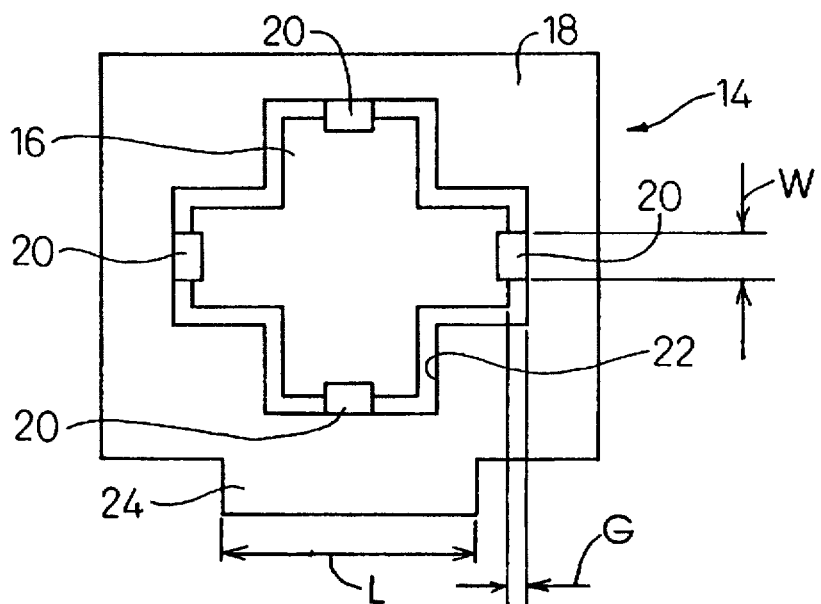
FIG. 3(a) is an enlarged top view of a projecting portion of the article fixture of FIG. 1.

As shown in FIGS. 3(a), (b), the upper part 18 has a generally rectangular profile, and a hollow portion 22 having a generally cruciform section is formed to extend between the top and bottom faces 18a and 18b thereof The lower part 16 has a prismatic shape with a generally cruciform section, and is accommodated within the hollow portion 22 of the upper part 18 while keeping a tiny gap G therebetween when the upper part 18 is displaced to the position of the second height H2. The interconnecting portion 20 is a thin, structurally weakened portion formed between the upper edge of the lower part 16 and the lower edge of the hollow portion 22 of the upper part 18. One interconnecting portion 20 is provided on every one tip of the cruciform section of the lower part 16, thus four interconnecting portions in total being provided.

Figure 4A:
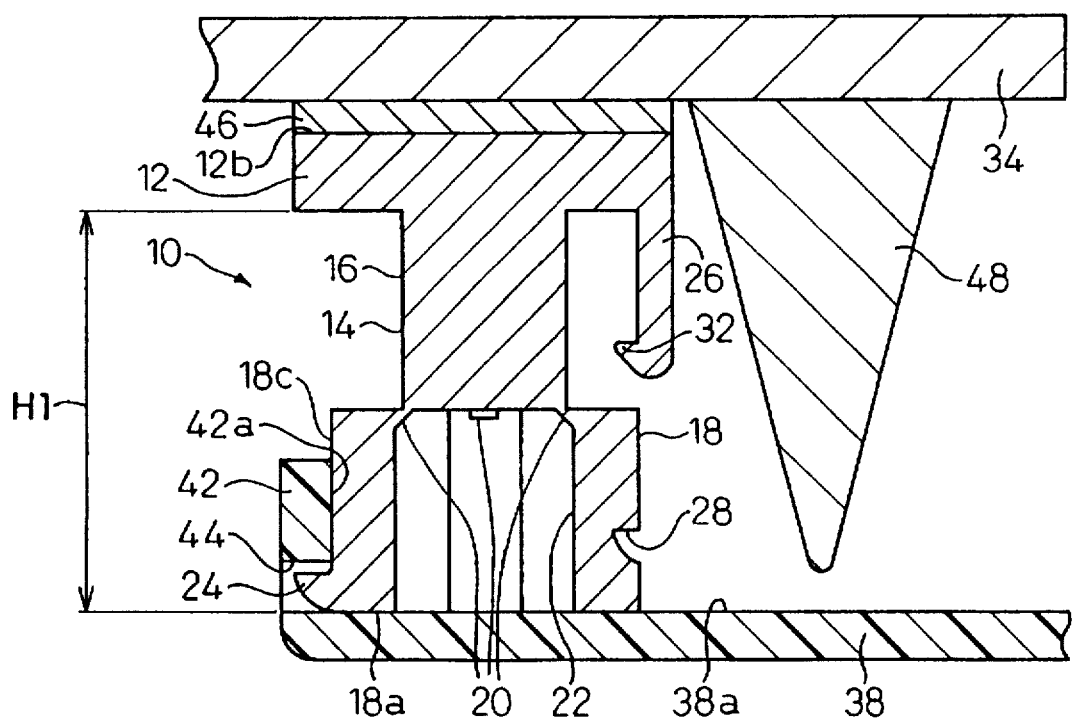
FIG. 4(a) is a sectional view of the article fixture of FIG. 1 showing the positioning step in which the projecting portion is at a first height.

The article fixture 10 is provided with a pawl 24 which acts as a lock means for mechanically locking the projecting portion 14 onto a predetermined position of the objective body. The pawl 24 is formed integrally with the upper part 18, and is projected adjacent the top face 18a and laterally from the side face 18c of the upper part 18, the side face 18c extending in the longitudinal direction of the base portion 12. The pawl 24 can be hooked to a groove or hole 44 provided in the objective body 38, as shown in FIG. 4(a), thereby mechanically stopping the displacement of the projecting portion 14 at least in a direction away from the objective body 38. Accordingly, it is preferred that the looking face 24a of the pawl 24 facing to the base portion 12 is arranged to intersect the side face 18c of the upper part 18 at an angle larger than 90°.

The article fixture 10 is further provided with, as a means for holding the projecting portion 14 at the position of the second height H2, a resilient hook 26 integrally formed with the base portion 12 and a recess 28 formed in the upper part 18 of the projecting portion 14. The hook 26 includes an arm 30 integrally projecting generally upright from the main face 12a of the base portion 12 along the longitudinal edge thereof, the arm being arranged opposite to the pawl 24 and side by side with the projecting portion 14, and a detent 32 projecting from the free end of the arm 32 toward the projecting portion 14. The recess 28 is formed on the side face 18d of the upper part 18 opposite to the pawl 24 and along the longitudinal direction of the base portion 12. While the upper part 18 is displaced from the first height H1 to the second height H2, the detent 32 of the hook 26 slides on the side face 18d of the upper part 18 while being shifted due to the resilient deformation of the arm 30, and is engaged in a snap manner with the recess 28 when the upper part 18 is reached to the second height H2. In this manner, the displacement of the upper part 18 in a direction of going back to the first height H1 is locked mechanically. Accordingly, it is preferred that the face 32a of the detent 32 facing to the base portion 12 intersects the side face 30a of the arm 30 at an angle larger than 90°.

The procedure of fitting the article to the objective body by using the article fixture 10 is described below with reference to FIGS. 4 and 5. In the following description, it is assumed that the article is a fixed type window glass 34 of vehicles or architectures, and the objective body is the flange 38 of a window frame 36.

The window frame 36, on which the window glass 34 is fitted, is provided with the flange 38 extending toward a window opening, for instance via a standing wall 40 defining a predetermined step portion. The standing wall 40 serves to reduce the difference in step between the outer surfaces of window glass 34 and window frame 36 when the window glass 34 is fixed on the flange 38. As a preparatory step, a wall 42 is formed at the edge of the flange 38 and preferably integrally extended from the glass fitting face 38a of the flange 38. The wall 42 is provided with a hole 44 for receiving the pawl 34 formed on the projecting portion 14 of the article fixture 10. The face 38a of the flange 38 and the face 42a of the wall 42 can be in contact with the top face 18a and the side face 18c of the upper part 18 of the projecting portion 14 of the article fixture 10, respectively.

For fixing the window glass 34 to the flange 38, an adhesive means 46 such as a double coated adhesive tape is first applied to the generally flat back face 12b of the base portion 12, and then the article fixture 10 is fixed by the adhesive means 46 to the window glass 34 at the position adjacent to the edge region of the window glass 34 where an adhesive layer (or a sealer) 48 is to be formed. Next, the adhesive layer 48 is applied in a suitable way, such as a painting, up to a height between the first height H1 and the second height H2, both may be occupied by the top face 18a of the upper part 18.

As a next step, the article fixture 10 is brought near the flange 38 of the window frame 36 to have the window glass 34 faced to the flange 38, and then the top face 18a of the upper part 18 staying at the first height H1 is abutted onto the face 38a of the flange 38. In this state, the window glass 34 is slightly moved on the flange 38 to let the pawl 24 formed on the upper part 18 of the projecting portion 14 be inserted into the hole 44 of the wall 42. As a result, the fixture 10, i.e., the window glass 34 is mechanically stopped regarding the displacement thereof at least in the direction away from the flange 38. Further, the side face 18c of the upper part 18 of the projecting portion 14 comes in close contact with the face 42a of the wall 42, thereby the window glass is disposed at a predetermined position on the flange 38 (see FIG. 4(a)).

As a next step, a predetermined pushing force is applied to the edge region of the window glass 34 in the direction toward the flange 38, the interconnecting portions 20 of the article fixture 10 are deformed and finally broken, so that the window glass 34 comes close to the flange 38 and the upper part 18 of the projecting portion 14 is displaced along the lower part 16 to the second height H2. At the second height H2, the lower part 16 is entirely received in the hollow portion 22 of the upper part 18, and the detent 32 of the hook 26 of the article fixture 10 is resiliently hooked in the recess 28 of the upper part 18. Thereby, the displacement of the upper part 18 in the direction of returning to the first height H1 is mechanically stopped, and thus the upper part 18 is kept at the second height H2.

Figure 4B:
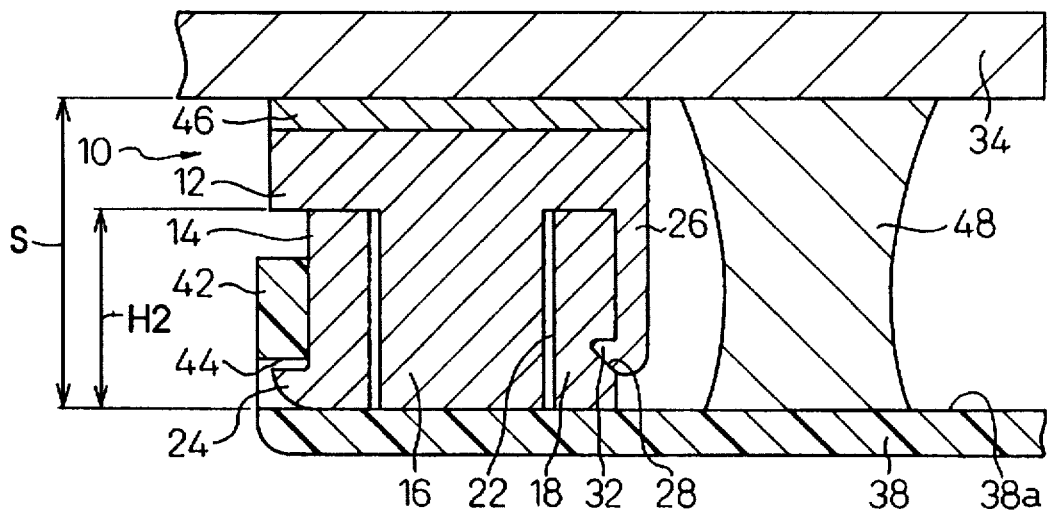
FIG. 4(b) is a sectional view of the fixture article of FIG. 4(a) in which the projecting portion is at a second height.

As described above, since the projecting portion 14 of the article fixture 10 is mechanically locked to the flange 38 by the pawl 24 and the displacement of the projecting portion 14 is mechanically stopped by the hook 26, the window glass 34 is fixedly connected with the flange 38, while keeping a predetermined space S equivalent to a total value resulting from addition of the second height H2 and the thickness of the base portion 12 of the article fixture 10 including the thickness of the adhesive means 46 (see FIG. 4(b)). At this time, the adhesive layer 48 is brought into contact with the face 38a of the flange 38. Mechanical holding force given by the pawl 24 together with the hook 26 is enough to prevent the window glass 34 from floating away from the flange 38 and to securely hold it against the vibration of the window frame 36 and variation in pressure imposed on the window glass 34. Accordingly, when the adhesive layer 48 is solidified under this condition, the window glass 34 and the flange 38 can be firmly fixed to each other in a predetermined positional relationship and the space therebetween can be sealed securely. The space S between the window glass 34 and the flange 38 has a value of, e.g., 5 mm to 8 mm, and the first height H1 of the projecting portion 14 has a value of, e.g., 8 mm to 14 mm.

As described above, the projecting portion 14 of the article fixture 10 makes it possible that, during the step of positioning an article (e.g., a window glass 34), the article is arranged at a predetermined position on the objective body (e.g., a flange 38), without allowing the adhesive layer 48 to be brought into contact with the objective body, due to the interconnecting portions 20 holding the upper part 18 at the first height H1 extended from the lower part 16. Accordingly, the positioning of the article is made much easier, and the objective body is surely prevented from being inadvertently marred with the adhesive agent. Since the first contact between the adhesive layer 48 and the objective body is made at the time when the interconnecting portions 20 are broken and the upper part 18 is displaced, it is possible to confirm the fitting state of the article by a sound which is generated when the interconnecting portions are broken, and a sound which is generated when the detent 32 is engaged with the recess 28.

In the present invention, a force required for causing the displacement of the projecting portion is preferably 49N to 490N (5 kg to 50 kg), and more preferably 98N to 147N (10 kg to 15 kg). When the force is less than 49N, the projecting portion will be displaced from the first height H1 with a slight force during the work for positioning the article, and thus the adhesive layer would make a contact with the object body to spoil it. Especially, in the case of the above embodiment, where the displacement of the projecting portion is resulted from the breakdown of the interconnecting portions, when the force is less than 49N, the sound of breakdown is made lower, so that it becomes difficult to confirm the fitting state of the window glass. Contrary to this, when the force is larger than 490N, the displacement of the projecting portion will become difficult, so that the fitting work of the article may become difficult.

Figure 3B:
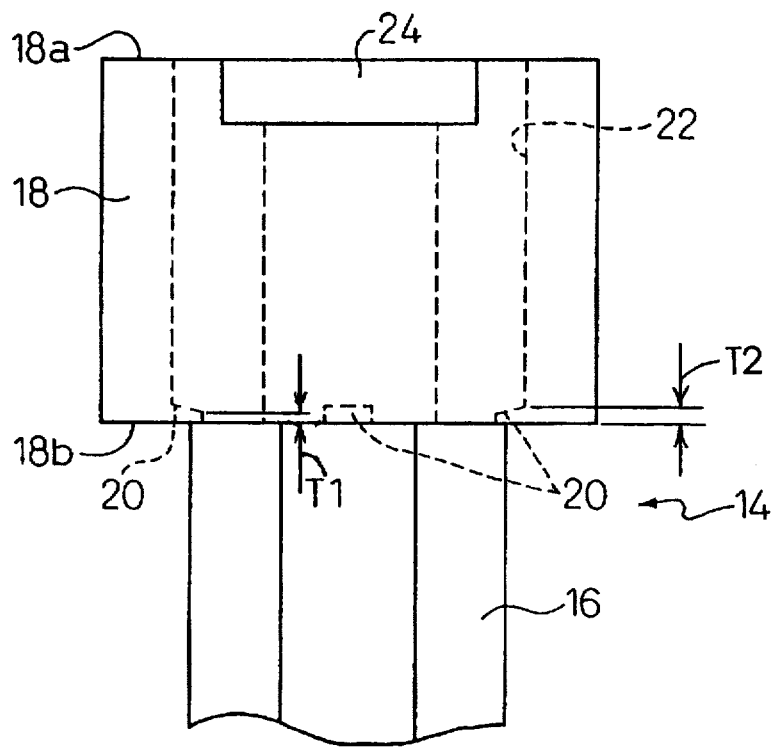
FIG. 3(b) is a front view of the projecting portion of the article fixture observed from an arrow III in FIG. 1.

In the above embodiment, the force required for causing the displacement of the projecting portion can be controlled by arbitrarily selecting the shape, dimension, disposition and number of the interconnecting portions, while taking account of easiness in formation thereof. In the above embodiment, the interconnecting portion 20 has a trapezoidal form in a vertical section as shown in FIG. 3(b), of which the part connected with the upper part 18 is made thicker than the part connected with the lower part 16. Consequently, in this case, the breakdown easily takes place at the part connected with the lower part 16. The part of the interconnecting portion 20, connected with the lower part 16, has a thickness T1 of, e.g., 0.1 mm to 2 mm, and the part of the same, connected with the upper part 18, has a thickness T2 of, e.g., 0.2 mm to 3 mm. Also, the interconnecting portion 20 has a width W of more than 1 mm, for instance.

Figure 5:
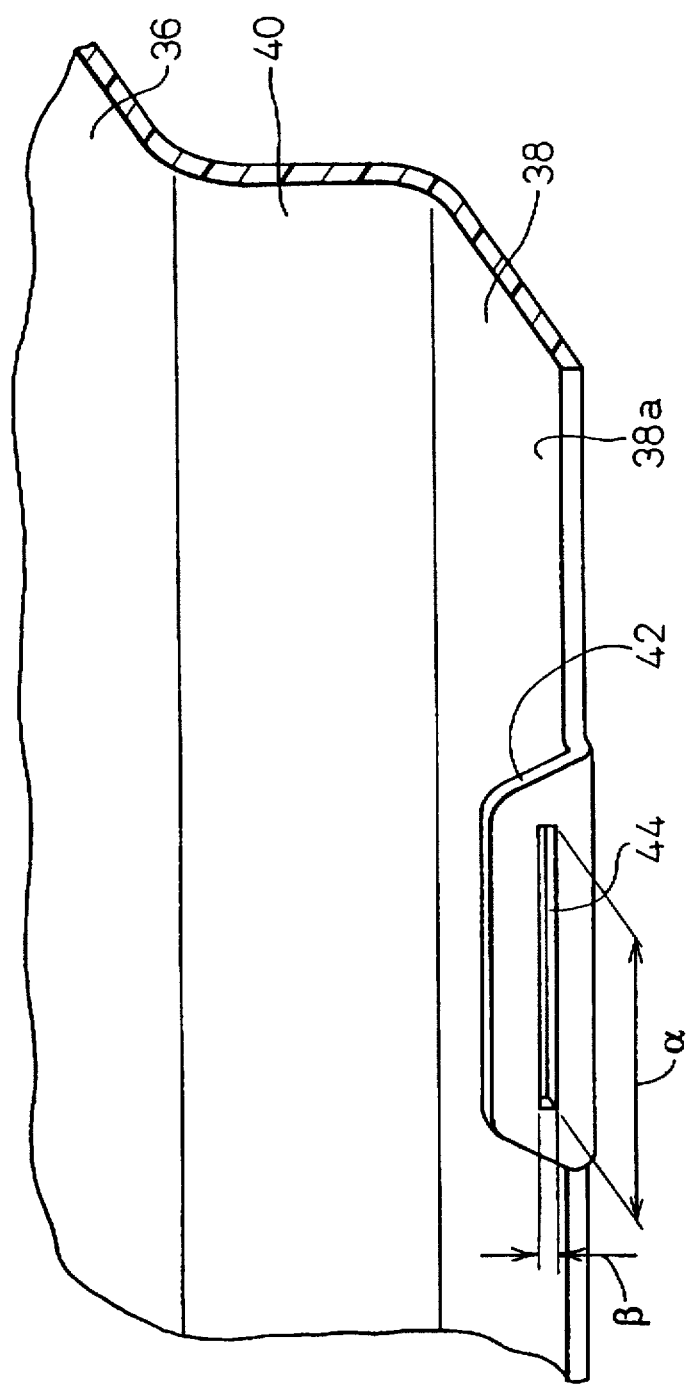
FIG. 5 is a fragmentary perspective view of a window frame as an objective body.

The hole 44 provided in the wall 42 of the flange 38 as shown in FIG. 5 may be made adequately longer than the length L (see FIG. 3(a)) of the pawl 24 formed with the upper part 18 of the projecting portion 14 of the article fixture 10. In this case, it is possible to slide the window glass 34 on the flange 38 within a range of difference between the lengths of the pawl 24 and hole 44, in a state where the pawl 24 is inserted into the hole 44 and the side face 18c of the upper part 18 is in contact with the face 42a of the wall 42. In a fitting process, therefore, this makes it possible to finely adjust the position of the window glass 34 on the flange 38. As another case, the hole 44 may have a contour almost identical to the pawl 24 but a little larger than the pawl in dimension. In this case, movement of the projecting portion 14 in the longitudinal direction of the hole 44 is mechanically locked, so that the window glass 34 can be easily and accurately fitted to a predetermined position of the flange 38 when the article fixture 10 is precisely fixed on a predetermined position of the window glass 34. The dimension of the hole 44 will be determined corresponding to the dimension of the pawl 24, and the hole length $\alpha$ is, e.g., 4 mm to 50 mm, and the hole height $\beta$ is, e.g., 1 mm to 5 mm.

Figure 6A:
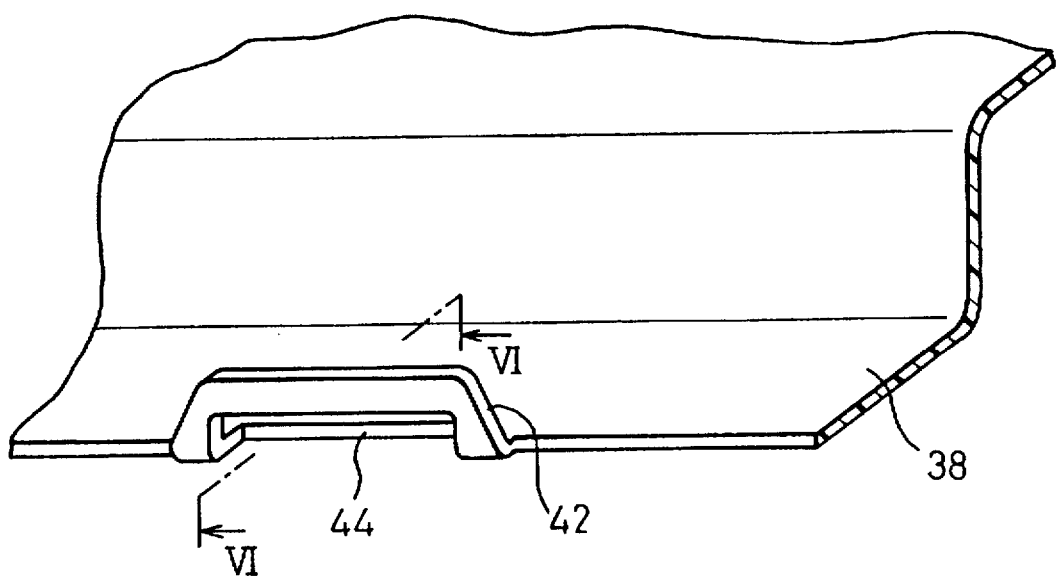
FIGS. 6(a) and 6(b) are illustrations of the modification of a window frame; with FIG. 4(a) being a partly perspective view, and 4(b) being a sectional view taken along a line VI—VI.
Figure 6B:
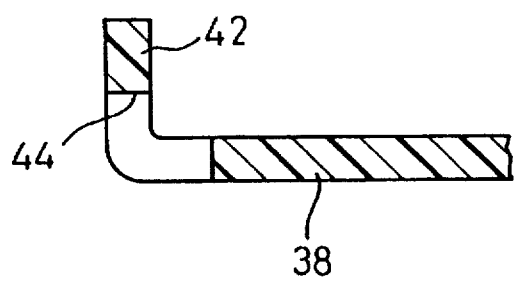

As shown in FIG. 4, when the height $\beta$ of the hole 44 is made larger than the size of the pawl 24, the pawl 24 can be more easily inserted into the hole 44. However, when the height $\beta$ of the hole 44 is excessively larger than the size of the pawl 24, the window glass 34 may be displaced in the direction away from the flange 38 until the adhesive layer 48 is fully solidified. To solve such a problem, as shown in FIGS. 6(a), (b), the hole 44 may be formed through in a wide area from the wall 42 to the flange 38, thereby enabling the pawl 24 to be easily inserted into the hole 44 without making the height $\beta$ of the hole 44 larger than the size of the pawl 24.

The article fixture according to the present invention may have various shapes and dimensions other than those described above. For instance, the height of the lower part 16 of the projecting portion 14 may be identical to or different from the height of the upper part 18 of the same. Further, the hollow portion 22 may have a dimension which could receive at least a part of the lower part 16, to allow the upper part 18 to be displaced from the first height H1 to the second height H2.

As to the cross sections of the hollow portion 22 and the lower part 16 to be received within the hollow portion 22, it is possible to consider other shapes than a cruciform section, for instance, a circular shape, an elliptic shape, a rectangular shape, a triangular shape, and so forth. However, those sections are preferably similar to each other, and in this case, the gap G (see FIG. 3(a)) is, e.g., 0.1 mm to 2 mm. According to such a construction, during the upper part 18 is displaced from the first height H1 to the second height H2, the inner surface of the hollow portion 22 slides on the outer surface of the lower part 16, thereby the upper part 18 can be smoothly guided along the lower part 16. Consequently, the work for fitting the article to the objective body is made more smooth, and the article is prevented from being shifted from its predetermined position during the projecting portion 14 is displaced. Further, it is possible to reduce the lateral shift of the upper part 18 relative to the lower part 16, thereby the accuracy in positioning of the article can be improved and inadvertent defection of the pawl 24 and hook 26 can be prevented.

When the cross sections of the lower part 16 and the hollow portion 22 are elliptic or polygonal, the relative rotation between the lower part 16 and the upper part 18 can be prevented, during the upper part 18 is displaced from the first height H1 to the second height H2. Whereby the fitting work of the article can be made smooth and the article can be prevented from being shifted from its predetermined position during the projecting portion 14 is displaced.

In order to improve the guide function of the projecting portion as described above, as shown in FIG. 7(a), it is preferred to provide the outer surface of the lower part 16 with a plurality of protuberances 50 so that these protuberances 50 are always in contact with the inner surface of the hollow portion 22 during the upper part 18 is displaced from the first height H1 to the second height H2. According to this construction, it is possible to improve the guide function of the projecting portion without increasing the friction between the lower part 16 and the upper part 18. Protuberances 50 may have a shape suitable for making a contact with the inner surface of the hollow portion in either way of point or line contact, as shown in FIG. 7(b), (c). The height of the protuberance 50 from the outer surface of the lower part 16 is almost equal to the gap G between the lower part 16 and the upper part 18, but when the protuberance 50 is resiliently deformable, the height may be a little larger than the gap G. Accordingly, the height of the protuberance 50 is, e.g., 0.1 mm to 2.0 mm.

Preferably, the width D of the base portion 12 of the article fixture 10 (see FIG. 1), especially in case of installing the window glass 34 on the flange 38, is as narrow as possible. For instance, in case of the fixing type window glass used in a motor car, a part of the window glass 34, which is to be superposed on the flange 38, is painted with black ceramic paint in order to cover up the flange 38, but if the portion painted in black is too large, the external appearance of the motor car will be spoiled. Therefore, the flange 38 is made as narrow as possible as long as it can support the window glass 34. Furthermore, the region for forming the adhesive layer 48, sufficient to firmly fix the window glass 34 onto the flange 38, has to be reserved in the edge region of the window glass 34. In view of these requirements, the width D of the base portion 12 of the article fixture 10 is preferably 4 mm to 30 mm, and more preferably 5 mm to 10 mm.

In the above-mentioned various numerical range, the example of preferred constitution of a product of the article fixture 10 shown in FIG. 1 is as follows. Regarding the dimension: the width D of the base portion 12=10 mm; the first height H1 of the projecting portion 14=8.2 mm; the second height H2 thereof=4.2 mm; the thickness T1 of the interconnecting portion 20=0.1 mm; the thickness T2 thereof 0.3 mm; the gap G between the lower part 16 and the hollow portion 22=0.2 mm (the tolerance thereof is +0 mm and −0.1 mm); the height of the hook 26 from the base portion 12=3.9 mm; the height of the wall 42 from the flange 38=4.5 mm; the length $\alpha$ of the hole 44 of the wall 42=14 mm; and the height $\beta$ thereof=3.0 mm. (The tolerances of these values other than the gap G are in a conventional range.) Further, the material is 6-nylon (trade mark), and the force required to displace the projecting portion is 100N.

The adhesive means 46 used for fixing the article fixture 10 onto the window glass 34 is preferably of a double coated tape including a foam base, such as a double coated acrylic foam tape or a double coated neoprene foam tape. For example, a preferred double coated acrylic foam tape is "#4215" and "#4213" commercially available from Sumitomo 3M Co. Ltd. of Japan, and a preferred double coated neoprene foam tape is "#4265" commercially available from Sumitomo 3M Co. Ltd. of Japan.

Figure 8:
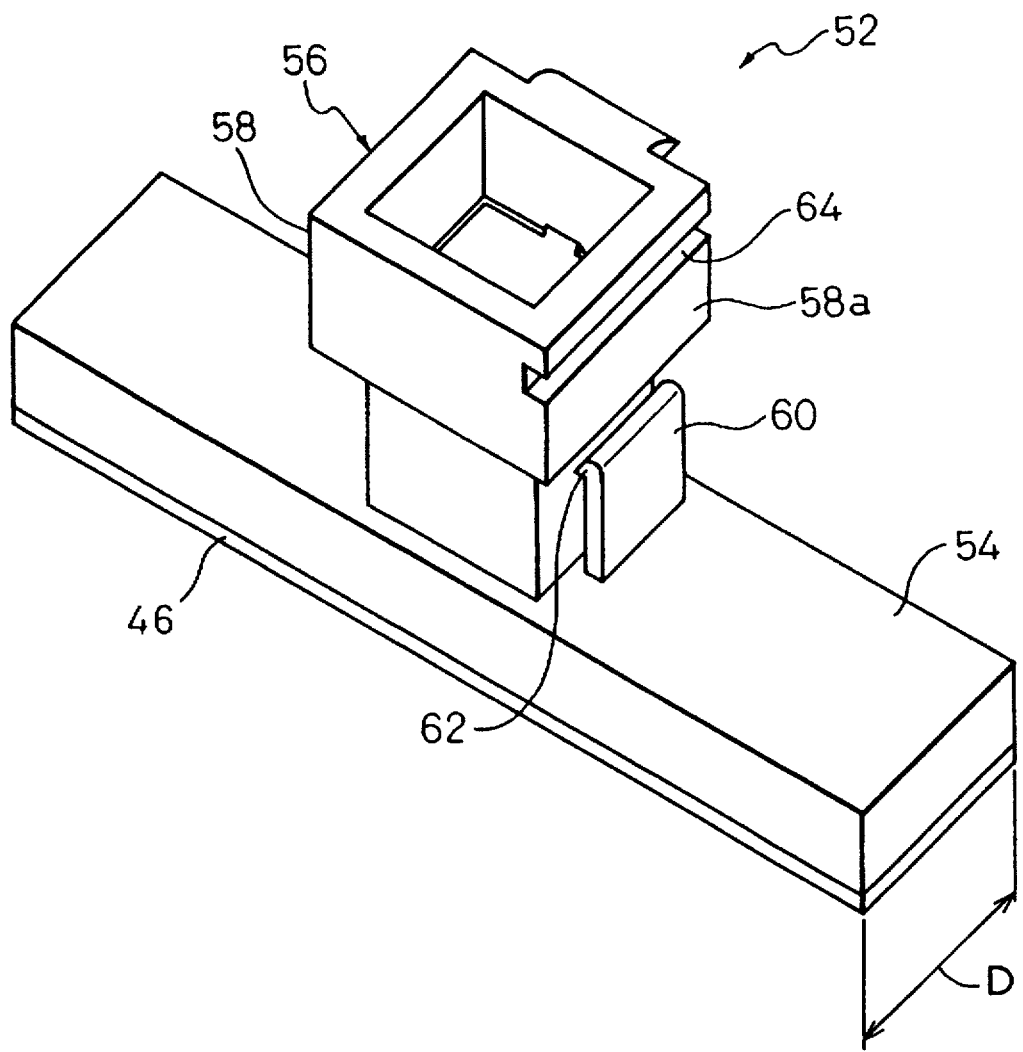
FIG. 8 is a perspective view of an article fixture according to another embodiment of the present invention.

In the article fixture 52 as shown in FIG. 8, in order to reduce the width D of the base portion 54, the hook 60 for holding the upper part 58 of the projecting portion 56 at the second height is located in the direction of traversing the base portion 54. Accordingly, the hook 60 is placed side by side with the projecting portion 56 in the longitudinal direction of the base portion 54. In this case, the recess 64 to be mated with the detent 62 of the hook 60 is formed on the side face 58a of the upper part 58 extending in the direction of traversing the base portion 54. According to this constitution, it becomes possible to arrange the hooks 60 and recesses 64 on the both sides of the projecting portion 56 in respect of the longitudinal direction of the base portion 54 without enlarging the width D of the base portion 54, so that the force for holding the upper part 58 at the second height is improved.

In the article fixture 66 as shown in FIG. 9(a) to (c), also to reduce the width D of the base portion 68, the hooks 74 for holding the upper part 72 of the projecting portion 70 at the second height are arranged near the lower part 76 of the projecting portion 70 so as to be inserted within the hollow portion 78 of the upper part 72. The hooks 74 are arranged transversely to the base portion 68 on the both sides of the lower part 76 in respect of the longitudinal direction of the base portion 68. In this case, the recess 82 to be mated with the detent 80 of the hook 74 is formed on the top face 72a of the upper part 72. The upper part 72 and the lower part 76 are connected with each other by two interconnecting portions 84. In this article fixture 66, the lower part 76 of the projecting portion 70 is made smaller in section than the hollow portion 78. However, during the upper part 72 is displaced from the first height to the second height, respective detents 80 of two hooks 74 are in slidably contact with the inner surface of the hollow portion 78 due to the elastic deformation of hooks 74, thereby the upper part 72 is smoothly guided along the lower part 76.

Figure 10:
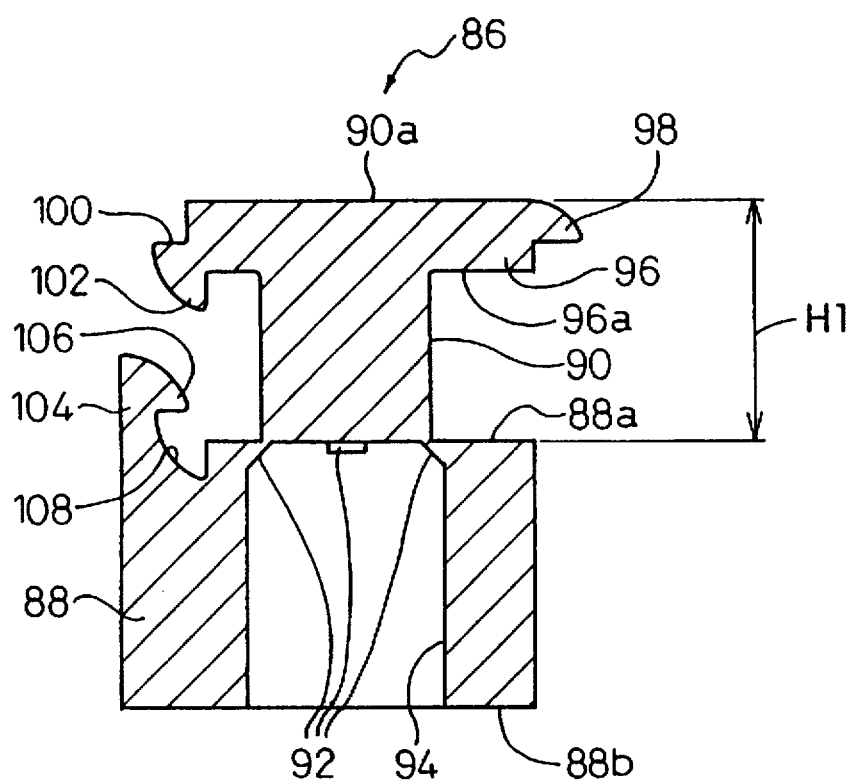
FIG. 10 is a sectional view of an article fixture according to further embodiment of the present invention.

FIG. 10 shows an article fixture 86 according to the other embodiment of the present invention. The article fixture 86 includes a base portion 88 to be fixed to the objective body and a projecting portion 90 arranged to be displaceable along the base portion 88. The projecting portion 90 is connected at a first height H1 extended from the base portion 88, as shown in the figure, with the base portion 88 through an interconnecting portion 92 breakable by a predetermined force. The base portion 88 includes a hollow portion 94 formed so as to penetrate a part between the main face 88a and rear face 88b thereof When the interconnecting portion 92 is broken, the projecting portion 90 is displaced from the first height H1 to the second height H2 lower than the first height H1 and is received in the hollow portion 94 while keeping a small gap therebetween. Note, it can be considered that this embodiment relates to an article fixture which comprises a projecting portion having a lower part (including a base portion) and an upper part, in a similar viewpoint to the embodiment shown in FIG. 1, wherein the lower part is provided with a hollow portion for receiving the upper part.

The projecting portion 90 is provided with an extension 96 laterally extending from the top region thereof apart from the base portion 88. When the article is fitted to the objective body, the top face 90a of the projecting portion 90 including the extension 96 is abutted onto the objective body, and the bottom face 96a of the extension 96 is made to contact with the main face 88a of the base portion 88 when the projecting portion 90 is displaced to the second height. The extension 96 includes a pawl 98 which is integrally formed therewith at one edge thereof and acts as a lock means for mechanically locking the projecting portion 90 to the objective body. At the other edge of the extension 96 opposing to the pawl 98, there are formed a recess 100 and a projection 102 which is adjacent to the recess 100 and is extended toward the base portion 88. The base portion 88 includes a resilient hook 104 integrally formed therewith to almost uprightly extend from the main face 88a thereof A detent 106 formed at the free end of the hook 104 to project toward the projecting portion 90, is hooked in a snap manner within the recess 100 when the projecting portion 90 is displaced from the first height H1 to the second height. At this time, a recess 108 formed in the base portion 88 near the detent 106 is coupled with the projection 102 adjacent to the recess 100. In this way, the displacement of the projecting portion 90 in a direction going back to the first height H1 is firmly and mechanically locked, thereby the projecting portion is held at the second height.

The article fixture 86 also can fixedly connect the article with the objective body while keeping a predetermined space therebetween. The article fixture 86 is fixed onto the article at a predetermined position by an adhesive means, such as a double coated adhesive tape applied to a generally flat rear face 88b of the base portion 88. However, the rear face 88b of the base portion 88 is inevitably provided with an opening of the hollow portion 94 in a molding process such as an injection molding. Consequently, in the article fixture 86, the area of the rear face 88b of the base portion 88 is narrower than that in the article fixture 10 of FIG. 1, thus the fixing force provided by the adhesive means may be reduced.

Figure 11:
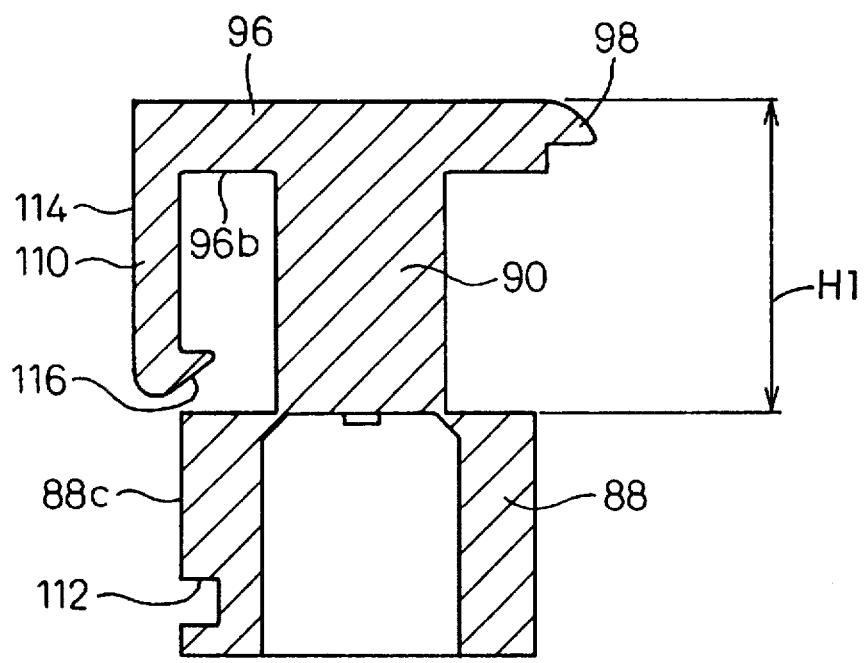
FIG. 11 is a sectional view of an article fixture according to still another embodiment of the present invention.

In the article fixture 86, a holding means for holding the projecting portion 90 at the second height may be composed of, as shown in FIG. 11, a resilient hook 110 integrally formed with the extension 96 of the projecting portion 90 and a recess 112 formed in the base portion 88. The hook 110 includes an arm 114 integrally and generally uprightly projecting from the bottom face 96b of the extension 96 along the edge of the extension 96 opposite to the pawl 98, and a detent 116 projecting toward the base portion 88 at the free end of the arm 114. A recess 112 is formed on the side face 88c of the base portion 88 on the same side as the hook 110. During the projecting portion 90 is displaced from the first height H1 to the second height, the detent 116 of the hook 110 slides on the side face 88c of the base portion 88 while being shifted due to the resilient deformation of the arm 114, and is hooked in a snap manner with the recess 112 when the projecting portion 90 is reached to the second height.

Figure 12:
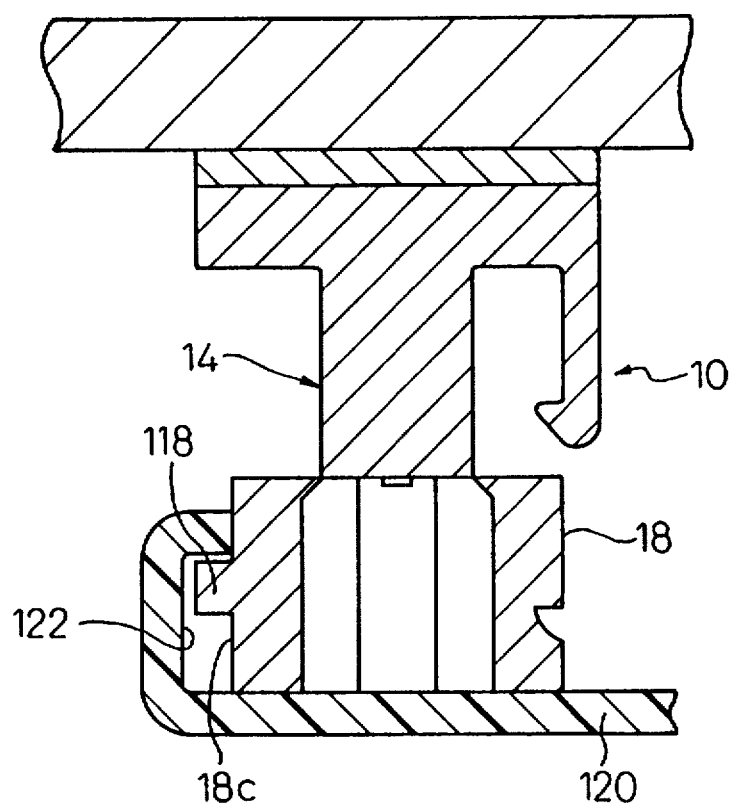
FIG. 12 is a sectional view of an article fixture together with an article and an objective body for showing the modification of a lock means.
Figure 13A:
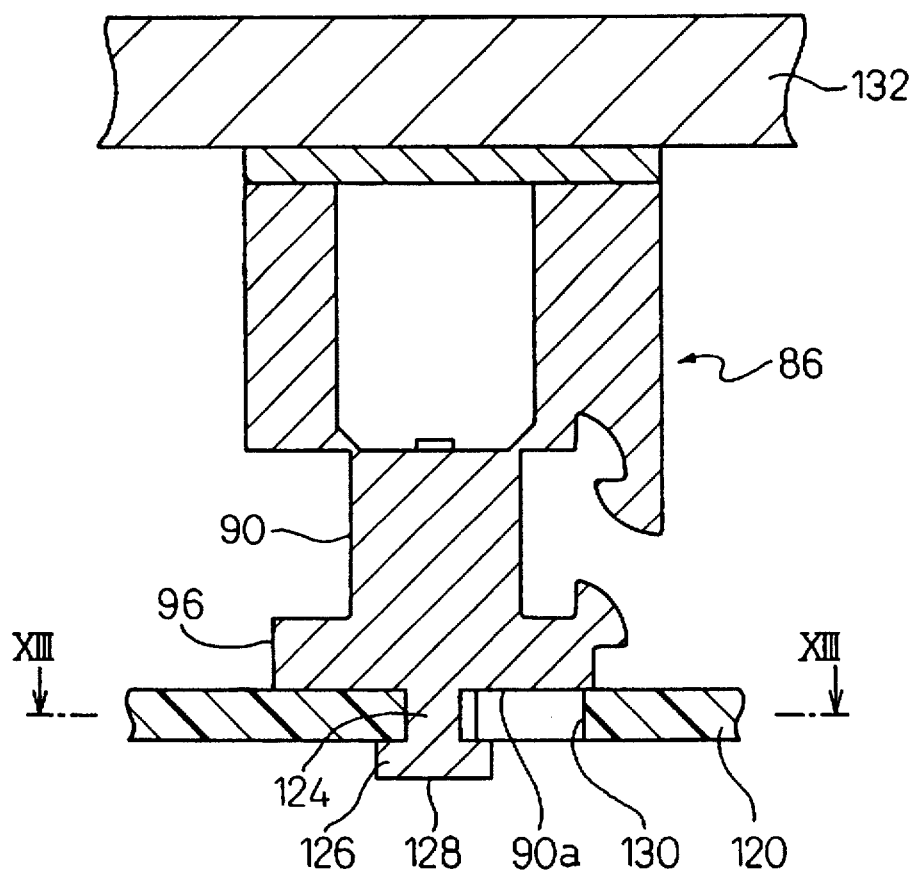
FIGS. 13(a) and 13(b) are illustrations of the modification of a lock means with FIG. 13(a) being a sectional view showing an article fixture together with an article and an objective body, and FIG. 13(b) being a sectional view taken along a line XIII—XIII.
Figure 13B:
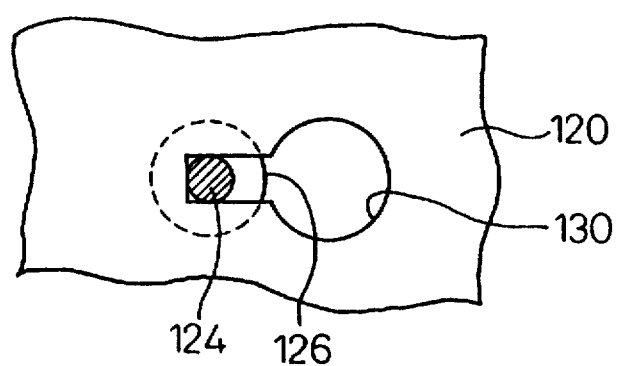

In each embodiment as described above, a lock means for mechanically locking the projecting portion 14, 19 at a predetermined position on the objective body can be constituted, for instance as shown in FIG. 12, with a projection 118 provided on the side face 18c of the upper part 18 of the projecting portion 14. In this case, the edge portion of the objective body 120 can be bent to form a depression 122 into which the projection 118 is hooked. Further, as shown in FIG. 13(a), (b), the lock means can be composed of a projection 128 which includes a shaft 124 protruding from the top face 90a of the projecting portion 90 and a circular plate 126 formed by enlarging the tip of the shaft 124. In this case, the objective body 120 may be provided with a through hole 130 like a key hole comprising a rectangular portion into which the shaft 124 can be inserted and a circular portion into which the circular plate 126 can be inserted. According to this constitution, the projecting portion 90 can be mechanically locked in a direction transverse to the rectangular portion of the through hole 130, so that the article 132 can be easily and accurately fitted to the predetermined position on the object body 120 if the article fixture 86 has been accurately fixed at a predetermined position of the article 132.

Figure 14A:
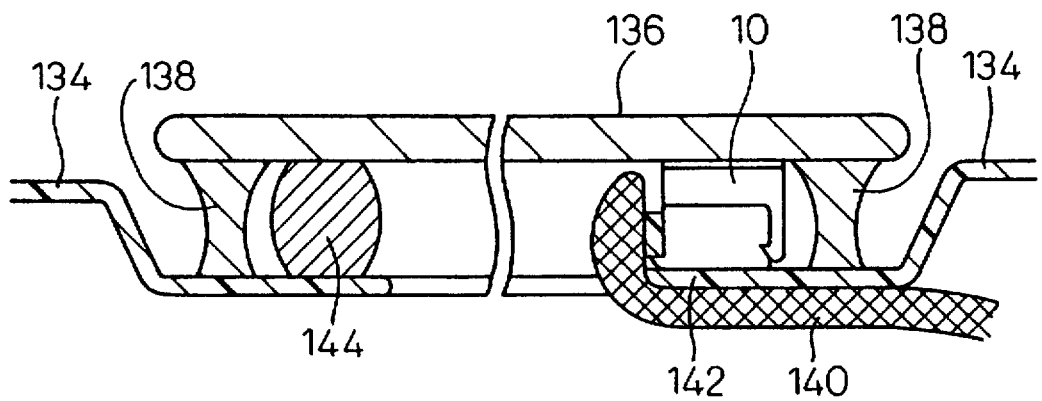
FIGS. 14(a) and 14(b) are illustrations of a car window glass on which the article fixture of FIG. 1 is installed with FIG. 14(a) being a sectional view taken along a line XIV—XIV, and FIG. 14(b) being a plan view.
Figure 14B:
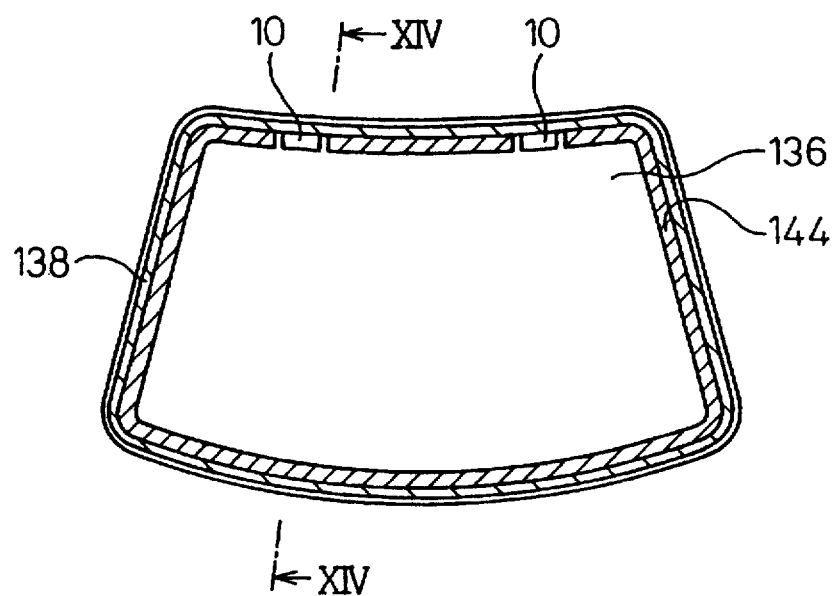

FIG. 14(a), (b) show a rear window glass 136 which is to be fitted to the motor car window frame 134 by using the article fixture 10 shown in FIG. 1. As illustrated, by applying the article fixtures 10 onto at least two points in the edge region of the rear window glass 136, it is possible to firmly hold the rear window glass 136 at a predetermined position on the window frame 134 against vibration of the motor car body and variation in the car room pressure, until an adhesive layer 138 is completely solidified, in the motor car production line. Further, an inner trim 140 is generally applied to the interior side of the window frame 134. In the article fixture 10, the pawl 24 for mechanically locking the projecting portion 14 to a window frame flange 142 is projected laterally from the projecting portion 14, so that the pawl 24 neither projects into a car interior nor interferes with the inner trim 140, thus the appearance of the car interior is not deteriorated. Further, it is possible to provide on the other part of the edge region of the rear window glass 136, where no article fixture 10 is arranged, with a barrier 144 made of a resin, referred to as a dam-rubber, to prevent the adhesive layer 138 from coming out to the window opening side. Still further, a window mole (not shown) may be disposed between the window frame 134 and the rear window glass 136 to improve the appearance of the adhesive region by covering the latter.

In respective embodiments as described above, the article fixture is constituted in such a manner that the projecting portion 14, 90 can be displaced from the first height to the second height by breaking the interconnecting portion 20, 92 by applying a predetermined force thereto. However, it should be noted that the present invention is not limited to these embodiments and that the displacement of the projecting portion from the first height to the second height may be carried out through plastic or elastic deformation of the projecting portion caused by a predetermined force.

The article fixture according to the present invention can be made of polymeric materials, such as polyamide resin, polyester resin, polypropylene resin, polyethylene resin, polyacetal resin, and so forth. Especially, polyamide resin is a preferred material because of its excellent properties regarding heat resistance, mechanical strength, and injection molding properties. Further, as is well known, the polymeric materials may be added with plasticizer, rubber, carbon fibers, and glass fibers. Still further, the article fixture according to the present invention can be formed by known injection or extrusion molding process.

As will be apparent from the above description, the article fixture according to the present invention is provided with a lock means for mechanically locking a projecting portion onto a predetermined position on an objective body, and a holding means for mechanically holding the projecting portion at a second height, so that the article and the objective body can be firmly and fixedly connected with each other against the external force, while keeping a predetermined space therebetween. According to the present invention, therefore, in case of adhesive bonding an object having a surface finished with high precision to an object having a surface finished with low precision, or adhesive bonding a relatively fragile object to a relatively tough one, it becomes possible to firmly and fixedly hold both objects against the external force, until an adhesive layer provided therebetween is completely solidified with a predetermined thickness.

I claim:

1. An article fixture having a base portion adapted to be fixed to an article and a projecting portion projecting from the base portion up to a first height and being displaceable from the first height to a second height lower than the first height by a predetermined force; the article fixture being used for positioning the article at a predetermined position on an objective body by abutting the projecting portion on the objective body when the projecting portion is put at the first height, and for fixedly connecting the article to the objective body while keeping a predetermined space therebetween when the projecting portion is put at the second height, characterized in that said article fixture comprises:

a lock means for mechanically locking said projecting portion onto a predetermined position on the objective body; and a holding means for mechanically holding said projecting portion at said second height.

2. An article fixture as claimed in claim 1, wherein said lock means comprises a projection which is integrally formed in an end region of said projecting portion so as to be locked onto the objective body.

3. An article fixture as claimed in claim 1, wherein said holding means comprises a resilient hook which is integrally formed with the article fixture, and a recess which is formed in the article fixture and is engaged with the hook when said projecting portion is put in said second height.

4. An article fixture as claimed in claim 1, wherein said projecting portion is connected at said first height with said base portion through an interconnecting portion breakable by a predetermined force, and said base portion is provided with a hollow portion which receives said projecting portion displaced at said second height by breaking said interconnecting portion.

5. An article fixture as claimed in claim 1, wherein said projecting portion includes a lower part projecting from said base portion and an upper part arranged displaceably along said lower part; said upper part being connected at said first height extended from said lower part with said lower part through an interconnecting portion breakable by a predetermined force, and said upper part being provided with a hollow portion which receives said lower part when said upper part is displaced in said second height by breaking said interconnecting portion.

6. An article fixture as claimed in claim 4, wherein said projecting portion and said hollow portion are dimensioned such that an outer surface of said projecting portion to be received in said hollow portion is always in contact with an inner surface of said hollow portion when said projecting portion is displaced from said first height to said second height.

7. An article fixture as claimed in claim 5, wherein said projecting portion and said hollow portion are dimensioned such that an outer surface of said projecting portion to be received in said hollow portion is always in contact with an inner surface of said hollow portion when said projecting portion is displaced from said first height to said second height.

8. An article fixture as claimed in claim 1, wherein the article is a fixed type window glass of a vehicle, and the objective body is a window frame of a vehicle body.

9. A method of fitting an article to an objective body by using an article fixture, wherein the article fixture has a base portion adapted to be fixed to an article and a projecting portion projecting from the base portion up to a first height and being displaceable from the first height to a second height lower than the first height by a predetermined force; the article fixture being used for positioning the article at a predetermined position on an objective body by abutting the protecting portion on the objective body when the projecting portion is put at the first height, and for fixedly connecting the article to the objective body while keeping a predetermined space therebetween when the projecting portion is put at the second height; said article fixture comprising a lock means for mechanically locking said projecting portion onto a predetermined position on the objective body; and a holding means for mechanically holding said protecting portion at a said height; characterized in that said method comprises the steps of:

fixing said article fixture to an article;

forming an adhesive layer on an article surface adjacent to said article fixture up to a height between said first and second heights of said projecting portion;

abutting said projecting portion in said first height onto the objective body, and mechanically locking said article fixture by said lock means onto a predetermined position on the objective body, thereby positioning the article to the predetermined position on the objective body;

displacing said projecting portion into said second height by applying a predetermined force, and mechanically holding said projecting portion by said holding means at said second height, thereby fixedly connecting the article with the objective body while keeping a predetermined space therebetween; and solidifying said adhesive layer between the article and the objective body.

* * * * *